(12) United States Patent  
Iwaki (10) Patent No.: US 7,036,622 B2
(45) Date of Patent: May 2, 2006

(54) TRACTOR FRAME AND METHOD OF MANUFACTURE THEREFOR

(76) Inventor: Koji Iwaki, 2-18-1 Inadera, Amagasaki-shi, Hyogo (JP)

( * ) Notice: Subject to any disclaimer, the term of this patent is extended or adjusted under 35 U.S.C. 154(b) by 125 days.

(21) Appl. No.: 10/107,370

(22) Filed: Mar. 28, 2002

(65) Prior Publication Data

US 2002/0153190 A1 Oct. 24, 2002

(30) Foreign Application Priority Data

Apr. 11, 2001 (JP) .............................. 2001-112536

(51) Int. Cl.
*B62D 21/00* (2006.01)

(52) U.S. Cl. ...................................... 180/311; 280/781
(58) Field of Classification Search ................ 180/311, 180/312; 280/781, 785, 796; 296/203.03, 296/204

See application file for complete search history.

(56) References Cited

U.S. PATENT DOCUMENTS

| 2,173,525 | A | * | 9/1939 | Wallace | 280/796 |
|---|---|---|---|---|---|
| 2,794,650 | A | * | 6/1957 | Schilberg | 280/790 |
| 4,264,264 | A | * | 4/1981 | McMillan et al. | 414/686 |
| 4,369,559 | A | * | 1/1983 | Phillips | 29/401.1 |
| 4,496,187 | A | * | 1/1985 | Pontecorvo | 296/182 |
| 4,737,067 | A | * | 4/1988 | Samejima et al. | 414/686 |
| 4,755,101 | A | * | 7/1988 | Hamada et al. | 414/686 |
| 5,123,805 | A | * | 6/1992 | Ishimori et al. | 414/686 |
| 5,248,237 | A | * | 9/1993 | Nakamura | 414/686 |
| 6,237,957 | B1 | * | 5/2001 | Takekata et al. | 280/781 |

FOREIGN PATENT DOCUMENTS

JP 57-15768 1/1982

\* cited by examiner

*Primary Examiner*—Paul N. Dickson
*Assistant Examiner*—Laura B. Rosenberg
(74) *Attorney, Agent, or Firm*—Sterne, Kessler, Goldstein & Fox P.L.L.C.

(57) ABSTRACT

A tractor frame comprises a pair of left and right cranked side frame elements disposed in parallel. Each of the cranked side frame elements includes a web portion at a longitudinally intermediate portion of the cranked side frame elements, a front level portion extended forward from the web portion, and a rear level portion extended backward from the web portion so that a top of the rear level portion is lower than a top of the front level portion. A footboard is provided on the top of the rear level portion.

12 Claims, 9 Drawing Sheets

TRACTOR FRAME AND METHOD OF MANUFACTURE THEREFOR

BACKGROUND OF THE INVENTION

1. Field of the Invention

The present invention relates to a tractor frame structure, and further to a manner for producing the tractor frame.

2. Background Art

A small tractor requires a simple tractor frame which is economical but strong enough to endure the weight of an engine mounted thereon. Therefore, a typical conventional simple tractor frame which is adaptable for a small tractor is longitudinally straight when viewed from the side, wherein left and right parallel side plates having a whole length of the tractor are extended straight in the longitudinal direction of the tractor.

Furthermore, a small tractor, if possible, preferably places its footboards for resting respective driver's feet thereon low enough to facilitate the driver's getting on and off the tractor. However, even if the tractor is of a small type, a front portion of the tractor frame must be high enough to be provided therebelow with a front axle casing. If the footboards are placed onto a longitudinally intermediate portion of the above-mentioned longitudinally straight tractor frame, the footboards become rather too high for getting on and off, thereby being inconvenient to such a small tractor that requires its footboards to also serve as steps for getting on and off the tractor.

Therefore, conventionally, as disclosed in Japanese Utility Model Laid Open Gazette No. Sho 57-15768 there has been provided a well-known tractor having a (cranked) tractor frame bent at its longitudinally intermediate portion so as to locate its rear level portion, over which footboards are spread, lower than its front level portion supporting the front axle casing and so on. However, each of left and right side members of the disclosed tractor frame is made of a bent plate having a constant width in its whole length, whose strength is poor at the bent longitudinally intermediate portion.

Furthermore, if a front working attachment such as a front loader is to be attached onto a front portion of the tractor, the conventional tractor frame is provided below the longitudinally intermediate portion thereof with a support frame for supporting the front working attachment so as to reinforce the tractor frame, thereby resulting in a troublesome work. It is still more complicated to provide the front working attachment onto a mid-mount tractor provided below the longitudinally intermediate bottom portion thereof with a middle working attachment such as a mower, because the middle working attachment must be removed so as to be prevented from interfering with the front working attachment or the front working attachment support frame. On the other hand, there arises a problem in the poor strength of the tractor frame if the front working attachment support frame is attached to lateral sides of the above-mentioned cranked side members so as to be prevented from interfering with the middle working attachment.

BRIEF SUMMARY OF THE INVENTION

An object of the present invention is to provide an economical and simple tractor frame structure particularly for small tractors, wherein footboards provided on the tractor frame for resting driver's feet can be low enough to serve as a step for getting on and off the tractor while the tractor frame is strong enough to support an engine, a front axle casing and a transmission, and a front working attachment to go with them.

To achieve the object, a tractor frame according to the present invention comprises a pair of left and right cranked side frame elements disposed parallel to each other. Each of the cranked side frame elements includes a web portion at a longitudinally intermediate portion of the cranked side frame elements, a front level portion extended forward from the web portion, and a rear level portion extended backward from the web portion so that a top of the rear level portion is lower than a top of the front level portion. The web portions of both the side frame elements are connected to each other through a cross member, thereby reinforcing the whole of the tractor frame, particularly the web portions as the longitudinally intermediate portion of the tractor frame. A footboard is provided on the top of the rear level portion, thereby being lowered in comparison with a case wherein it is disposed at a height of the top of the front level portion of the side frame element. Such a lowered footboard facilitates drivers getting on and off a tractor, thereby being convenient for small tractors.

Furthermore, the web portion of each of the cranked side frame elements is longer in the longitudinal direction of the tractor frame than the total vertical height of the front and rear level portions, thereby being secured in its strength. Particularly, if the tractor frame is constituted by jointing rear bottom edges of a front frame member and front top edges of a rear frame member to each other as discussed later, such a longitudinally long web portion structure means that the junctions between the front and rear frame members are longitudinally extended so as to strongly joint the front and rear frame members to each other.

Furthermore, for securing the strength of the web portions, backplates may be patched over the web portions of the respective cranked side frame elements. Alternatively, the web portions may be thickened.

By reinforcing the tractor frame in this way, the front level portions of the cranked side frame elements steadily support an engine and a front axle casing, and the rear level portions of the cranked side frame elements steadily support a transmission.

Furthermore, a support frame for supporting a front working attachment is attached onto lateral sides of the web portions whose strength is secured by the cross member and by the backplates (or by the thickening thereof), thereby securely supporting the front working attachment. Therefore, a support frame for supporting the front working attachment does not have to be disposed below the longitudinally intermediate portion of the tractor frame so that a middle working attachment disposed below the longitudinally intermediate portion of the tractor does not have to be removed, thereby facilitating attaching the front working attachment to the tractor, and enabling both the front and middle working attachments to be simultaneously attached to the tractor so as to increase the utility of the tractor.

In this structure, a fixture portion of the support frame is joined to the web portion of each of the cranked side frame elements. The fixture portion of the front working attachment support frame can be as vertically long as the web portion, which is vertically longer than any other portions (the front and rear level portions) of each cranked side frame element, thereby being strong enough to support the front work attachment. Furthermore, if the longitudinal length of the web portion is larger than the total height of the front and rear level portions, the fixture portion can be longitudinally long enough to support the front working attachment strongly.

Incidentally, at least two of the cross members between the web portions may be juxtaposed before and behind so that a base of a steering column is supported across them. Therefore, the cross members for connecting and reinforcing the side frame elements also serve as members for supporting the steering column, thereby saving the number of parts and costs.

A second object of the present invention is to provide a manner for producing the above-mentioned tractor frame having the two cranked side frame elements.

To achieve the second object, a front frame member and a rear frame member are joined to each other so as to constitute the left and right side frame elements. The front frame member comprises a pair of parallel left and right side portions. Each of the side portions of the front frame member serves as the front level portion and an upper half of the web portion in each of the cranked side frame elements. The rear frame member comprises a pair of parallel left and right side portions. Each of the side portions of the rear frame member serves as the rear level portion and a lower half of the web portion in each of the cranked side frame elements. Rear bottom edges of the side portions of the front frame member are joined to front top edges of the respective side portions of the rear frame member, thereby constituting the left and right cranked side frame elements. The cross member is interposed between the left and right web portions constituted by the vertically overlapping portions of the front and rear frame members so as to connect the web portions to each other.

Before being joined to each other, the separate front and rear frame members which are short and light can be easily dealt with and carried for various processes, thereby simplifying the flow of manufacturing the tractor frame.

Alternatively, each of the cranked side frame members may be made of a single member, thereby reducing the number of parts for constituting the tractor frame. The crank-shape of the side frame member may be provided by shaving, cutting or so on.

These, other and further objects, features and advantages of the present invention will appear more fully from the following description.

DETAILED DESCRIPTION OF THE INVENTION

Figure 1:
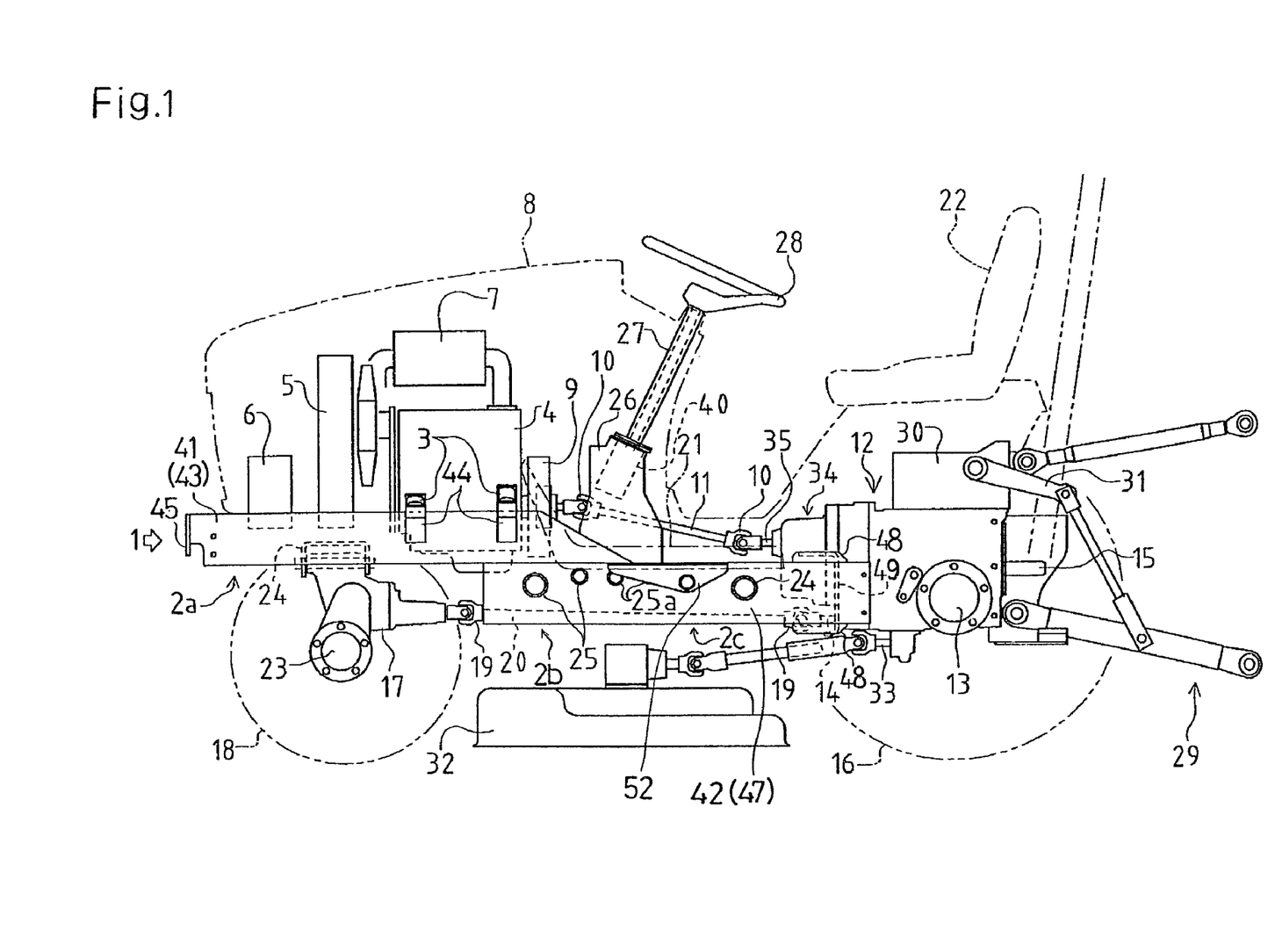
FIG. 1 is a side view of an entire tractor installed with a tractor frame 1 according to a first embodiment of the present invention.

Referring to FIG. 1, description will be given of a general structure of a tractor provided below a middle bottom thereof with a mower as an embodiment of the present invention.

A tractor frame 1 is disposed in a longitudinal direction of the tractor. Left and right engine stays 44 project laterally outwardly slantwise from a longitudinally intermediate portion of tractor frame 1 which is rather near to the front end of tractor frame 1. An engine 4 is mounted on all engine stays 44 through respective vibration-isolaters 3. A radiator 5 and a battery 6 are disposed in front of engine 4. A muffler 7 is disposed above engine 4. Such instruments including engine 4 are covered with a hood 8.

A flywheel 9 is fixed onto a crankshaft of engine 4. The torque of flywheel 9 is transmitted to a transmission 12 fixedly provided on a rear end of tractor frame 1 through universal joints 10 and a propeller shaft 11.

Transmission 12 supports rear axles 13, a front wheel driving shaft 14 and a rear PTO shaft 15 and transmits power of engine 4 to them. Rear wheels 16 are provided onto outer ends of respective rear axles 13.

A front axle casing 17 is suspended onto the front portion of tractor frame 1. A front axle 23 projects laterally outward from each of left and right sides of front axle casing 17 so as to support a front wheel 18. The torque of front wheel driving shaft 14 is transmitted into front axle casing 17 through universal joints 19 and a propeller shaft 20, thereby driving front wheels 18.

The tractor is provided at a rear portion thereof with a three point linkage 29 to which a rear working attachment can be connected. A hydraulic lift controller 30 is provided on a top surface of transmission 12 so as to move lift arms 31 vertically, thereby changing height of the rear working attachment. A driver's seat 22 is provided on a top surface of hydraulic lift controller 30.

A mower 32 is disposed below the middle bottom of the tractor. Transmission 12 is provided below a bottom thereof with a mower driving shaft 33 so as to drive mower 32.

A hydrostatic transmission (hereinafter, "HST") 34 serving as a main speed controller is disposed in front of transmission 12. An input shaft 35 of HST 34 projects horizontally forward from HST 34. A front end of input shaft 35 is connected to flywheel 9 of engine 4 through universal joints 10 and propeller shaft 11. The torque of flywheel 9 is shifted steplessly by HST 34 and transmitted to axles 13, rear PTO shaft 15 and so on through a sub speed controller in transmission 12.

Figure 2:
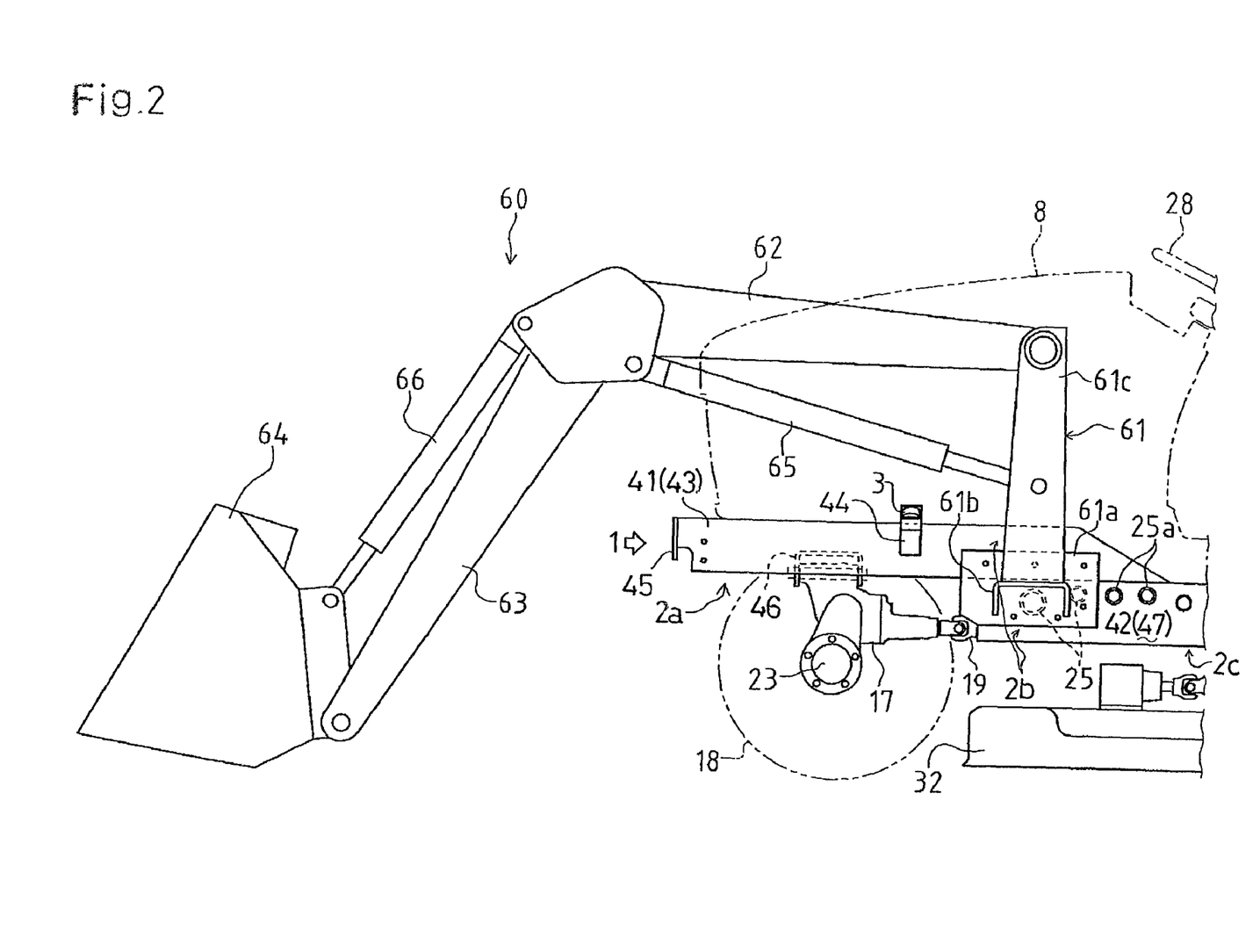
FIG. 2 is a side view of a front portion of the tractor wherein a front loader 60 is supported by tractor frame 1.

Referring to FIG. 2, the tractor can be provided at the front portion thereof with a front loader 60. For constituting front loader 60, a pair of support frames 61 are fixed onto respective left and right side surfaces of tractor frame 1. A main arm 62 is vertically rotatably extended forward from a top end of each of support frames 61 (i.e., later-discussed masts 61c thereof). A second arm 63 is extended from an utmost end of each of main arms 62. A bucket 64 is relatively vertically rotatably supported by utmost ends of both second arms 63.

A hydraulic cylinder 65 is provided for vertically rotating main arm 62 and second arm 63 relative to each of support frames 61. A hydraulic cylinder 66 is provided for vertically rotating bucket 64 relative to arms 62 and 63. Hydraulic cylinders 65 and 66 are driven by a hydraulic pressure device provided in the tractor, thereby locating bucket 64 at various positions and angles so as to load a cart.

Referring to FIGS. 1 to 9, tractor frame 1 comprises a pair of left and right side frame elements 2 disposed in parallel and connected to each other. Each side frame element 2 is cranked at a longitudinally intermediate portion thereof. Thus, each of left and right side frame elements 2 consists of a front level portion 2a, a web portion 2b and a rear level portion 2c. Front portion 2a is extended horizontally forward from web portion 2b, and rear level portion 2c is extended horizontally backward from web portion 2c. Rear portion 2c falls a degree from front level portion 2a. Each of left and right footboards 21, on which a foot of a driver sitting on seat 22 rests, is provided on a top edge of rear level portion 2c of each side frame element 2, thereby being low enough to facilitate drivers getting on and off the tractor. Consequently, tractor frame 1 is advantageously adaptable for a small tractor.

The vertical heights of front and rear level portions 2a and 2c are substantially equal to each other, and the longitudinal length of web portion 2b (in the longitudinal direction of tractor frame 1) is larger than each of the vertical widths of front and rear level portions 2a and 2c. More specifically the longitudinal length of web portion 2b is larger than the total vertical height of front and rear level portions 2a and 2c, i.e., the vertical height of web portion 2b. Thus, web portion 2b is generally quadrilaterally elongated in the longitudinal direction of tractor frame 1. If tractor frame 1 is constituted by joining front and rear frame members 41 and 42 as discussed below, front and rear frame members 41 and 42 can be strongly joined to each other through junctions between both frame members 41 and 42 sufficiently extended in the longitudinal direction of tractor frame 1.

For making such tractor frame 1 having two cranked side frame elements 2, two embodiments will be described. One will be described in accordance with FIGS. 1 to 5, and the other in accordance with FIGS. 6 to 9.

Referring to a first embodiment of making tractor frame 1 shown in FIGS. 1 to 5, tractor frame 1 is constructed by joining a front frame member 41 and a rear frame member 42 to each other. Before being joined to each other, such separate frame members 41 and 42 which are short and light can be easily dealt with and carried for drilling or other processes, thereby simplifying the manufacture of tractor frame 1.

Figure 3:
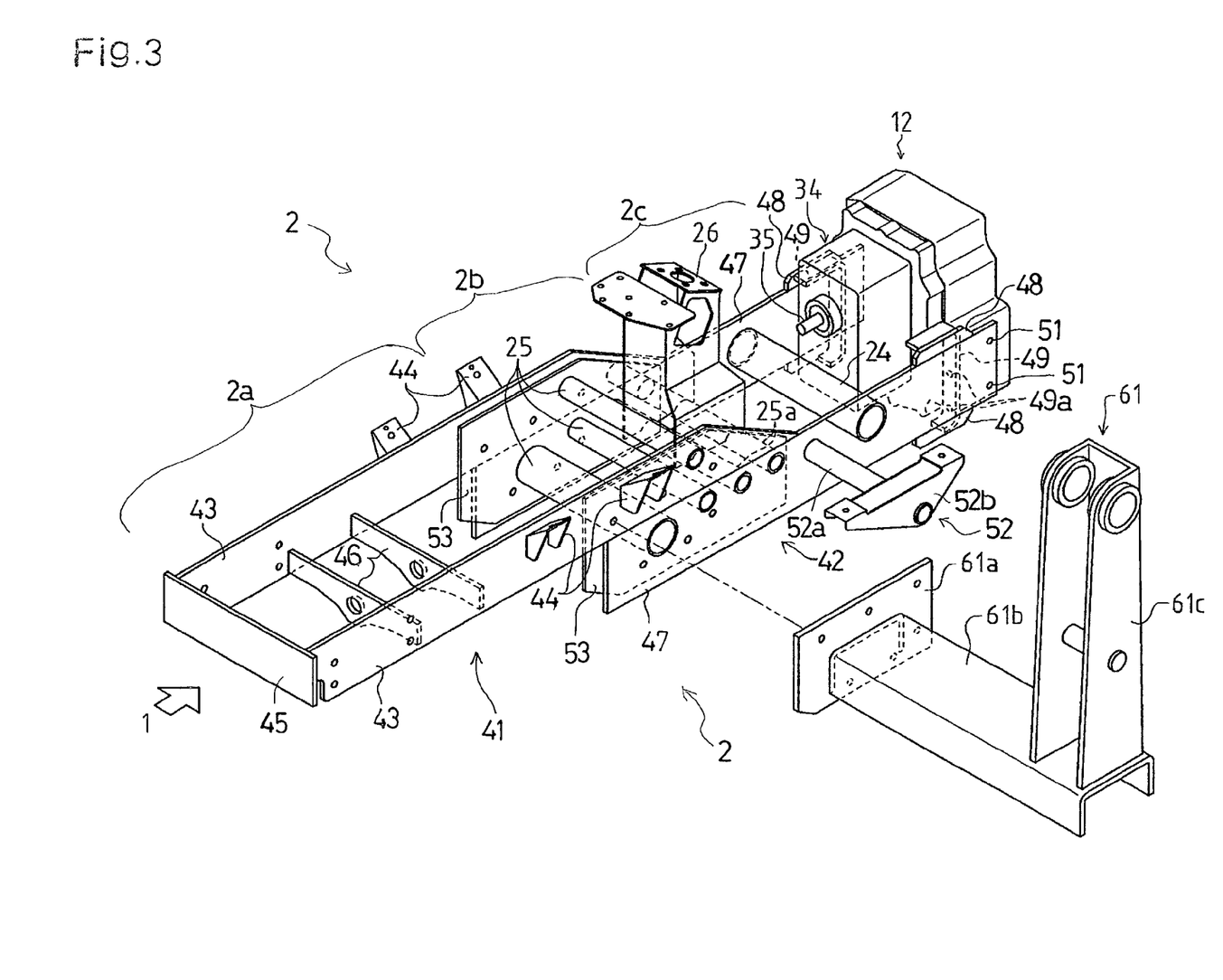
FIG. 3 is a perspective view of tractor frame 1 while a support frame 61 for supporting front loader 60 is being attached thereto.
Figure 4:
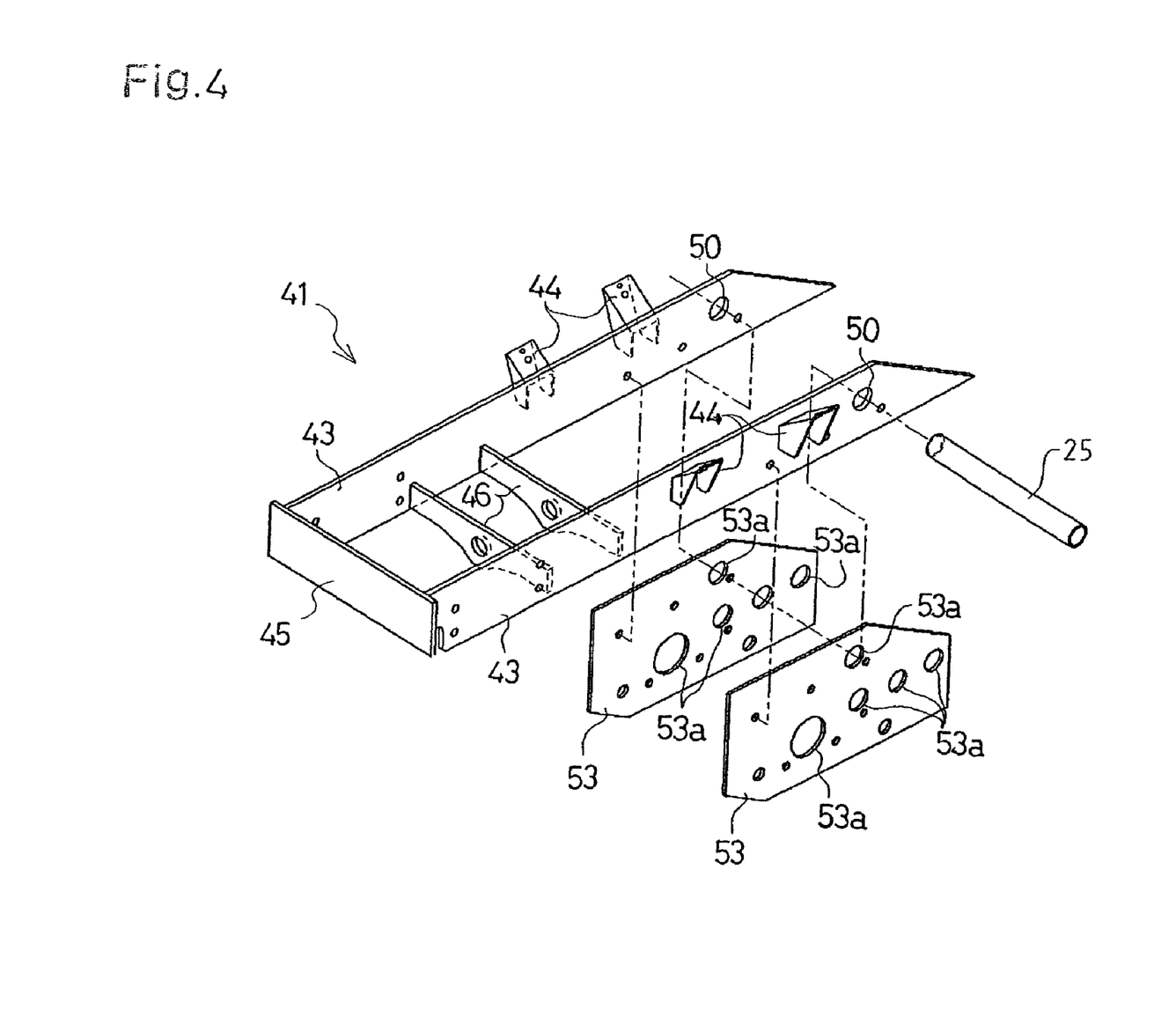
FIG. 4 is an exploded view in perspective of a front frame member 41 of tractor frame 1 while backplates 53 and a crossbar 25 are being attached thereto.

As shown in FIGS. 3 and 4, front frame member 41 comprises a pair of left and right side plates 43 which are disposed so as to be thin in a lateral direction of the tractor and extended in a longitudinal direction of the tractor in parallel to each other. A great portion of side plate 43 including its front end serves as front level portion 2a of side frame element 2. The remaining rear portion of side plate 43 serves as an upper half of web portion 2b of side frame element 2.

Engine stays 44, onto which engine 4 is mounted as mentioned above, project upward and laterally outward from longitudinally intermediate portions of both side plates 43. Left and right side plates 43 are connected to each other at their front ends through a front end plate 45 and through a pair of front and rear brackets 46 behind front end plate 45, thereby constituting front frame member 41. Front axle casing 17 is suspended from brackets 46.

Figure 5:
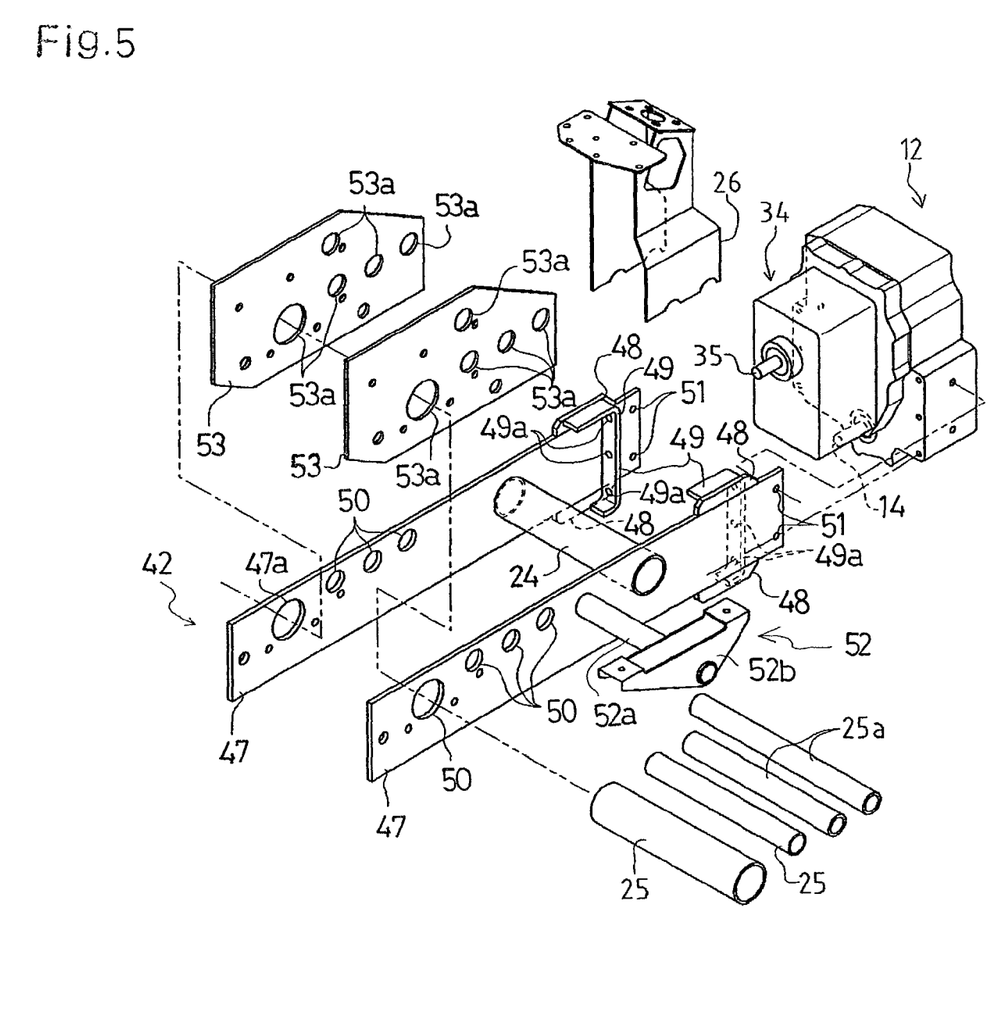
FIG. 5 is an exploded view in perspective of a rear frame member 42 of tractor frame 1 while a transmission 12, backplates 53 and crossbars 25 and 25a are being attached thereto.

As shown in FIGS. 3 and 5, rear frame member 42 comprises a pair of left and right side plates 47 which are disposed so as to be thin in the lateral direction of the tractor and extended in the longitudinal direction of the tractor in parallel to each other. A great portion of side plate 47 including its rear end serves as rear level portion 2c of side frame element 2. The remaining front portion of side plate 47 serves as a lower half of web portion 2b of side frame element 2. Left and right side plates 47 are joined to each other through a rear crossbar 24 interposed therebetween. A U-like shaped transmission stay 49 is joined at its vertically intermediate portion by welding it to a rear inner side surface of each of side plates 47. Reinforcing plates 48 are fixed by welding to respective rear top and bottom edges of each of side plates 47. Top and bottoms edges of each of transmission stays 49 are fixed by welding to respective reinforcing plates 48, thereby strongly fixing transmission stay 49 to each side plate 47.

Each of transmission stays 49 is bored through with bolt holes 49a in the longitudinal direction of tractor frame 1. Left and right portions of a front surface of a housing of transmission 12 are fastened to respective transmission stays 49 through bolts screwed into bolt holes 49a. Each of side plates 47 is bored through a rear end portion thereof with bolt holes 51 in the lateral direction of tractor frame 1. Left and right side surfaces of the housing of transmission 12 are fastened to respective side plates 47 through bolts screwed into bolt holes 51.

For constituting left and right side frame elements 2, front frame member 41 is joined to rear frame member 42, that is, a rear bottom edge of each side plate 43 is fixed by welding it to a front top edge of each side plate 47. Whereby, the rear portion of side plate 43 and the front portion of side plate 47 are vertically overlapped with each other so as to web portion 2b of cranked side frame element 2.

On each of left and right side frame elements 2 constituted by front and rear frame members 41 and 42, a backplate 53 is patched over an inner surface of web portion 2b, that is, across the rear inner side surface of side plate 43 and the front inner side surface of side plate 47. More specifically, each backplate 53 is fixed by welding it at its upper half portion to side plate 43 of front frame member 41, and at its lower half portion to side plate 47 of rear frame member 42.

Referring to a second embodiment of making tractor frame 1 shown in FIGS. 6 to 9, each of left and right side frame elements 2 of tractor frame 1 is made of a single crank-shaped side frame member 55 having an entire length of tractor frame 1.

The crank-shape of side frame member 55 is made by cutting, shaving or so on, thereby forming a front level portion 55a, a web portion 55b and a rear level portion 55c, which serve as front level portion 2a, web portion 2b and rear level portion 2c of side frame element 2, respectively.

Similarly with the first embodiment of making tractor frame 1, both side frame members 55 are connected at front and rear level portions 55a and 55c thereof to each other through front end plate 45, brackets 46 and rear crossbar 24. Engine stays 44 are provided onto front level portions 55a of both side frame members 55 for mounting engine 4 thereon. Brackets 46 are used for suspending front axle casing 17.

Figure 8:
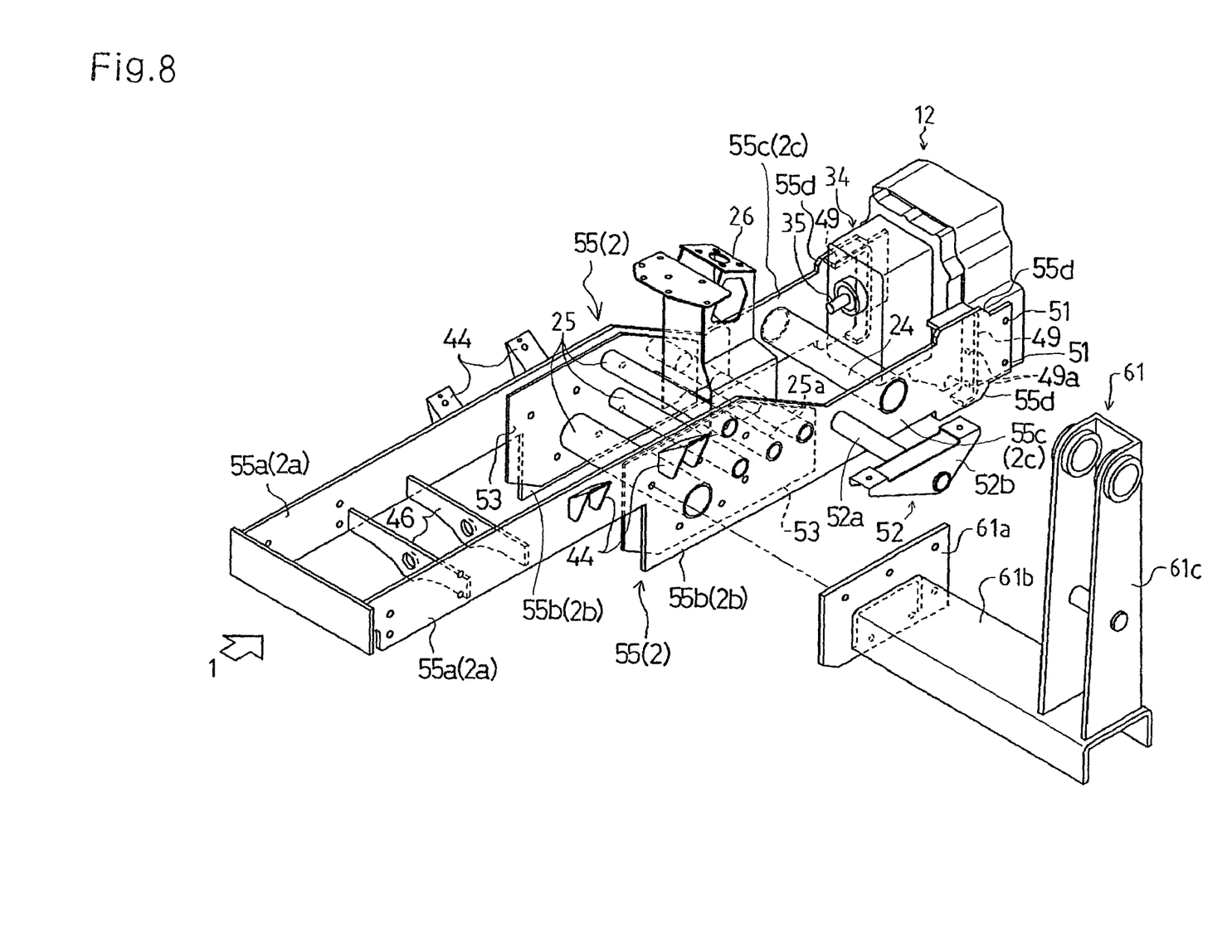
FIG. 8 is a perspective view of tractor frame 1 according to the second embodiment while support frame 61 for supporting front loader 60 is being attached thereto, wherein tractor frame 1 is provided with backplates 53.
Figure 9:
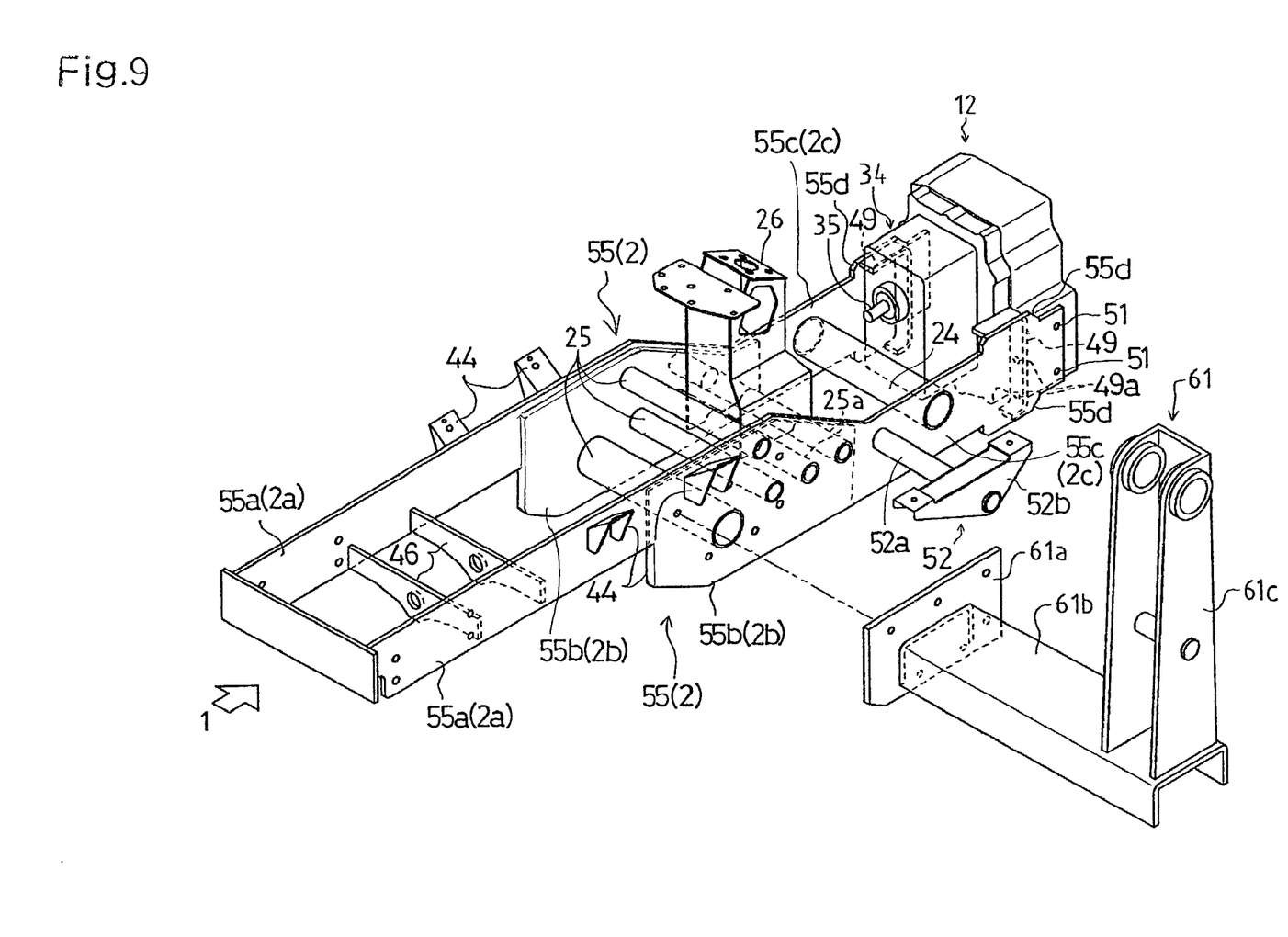
FIG. 9 is a perspective view of another tractor frame 1 according to the second embodiment while support frame 61 for supporting front loader 60 is being attached thereto, wherein tractor frame 1 is thickened at its longitudinally intermediate portion without backplates 53.

Also, both side frame members 55 are provided at their rear portions with transmission stays 49, bolt holes 51 and so on, thereby enabling transmission 12 to be fastened to their rear portions. As shown in FIGS. 8 and 9, instead of reinforcing plate 48, rear level portion 55c may be vertically expanded so as to provide top and bottom expanded portions 55d, to which the top and bottom edges of each transmission stay 49 are fixed. If possible, transmission stay 49 may be integrally formed with side frame member 55.

Furthermore, as shown in FIG. 8, each of backplates 53 is patched over an inside surface of web portion 55b of side frame member 55, thereby reinforcing the longitudinally intermediate portion of side frame member 55. Backplate 53 is substantially as vertically long as web portion 55b between its top and bottom edges.

Alternatively, as shown in FIG. 9, web portion 55b of each of side frame members 55 may be thickened laterally inward instead of using backplate 53.

Referring to both the first and second embodiments of making tractor frame 1, as shown in FIGS. 3 to 5, 7 and 8, a plurality of cylindrical crossbars 25 and 25a are interposed laterally horizontally between web portions 2b of left and right side frame elements 2, thereby connecting both side frame elements 2 to each other while reinforcing tractor frame 1.

For providing crossbars 25 and 25a, all side plates 43 and 47 or both side frame members 55 are bored through with a plurality of holes 50 having outer diameters which are substantially as large as those of respective crossbars 25 and 25a. Furthermore, both backplates 53, if being provided, are bored through with holes 53a corresponding to holes 50 of side plates 43 and 47 or side frame members 55. Left and right ends of crossbars 25 and 25a are inserted into holes 50 (through holes 53a of backplates 53) and fixed to side plates 43 and 47 or side frame members 55 by welding or so on.

Figure 6:
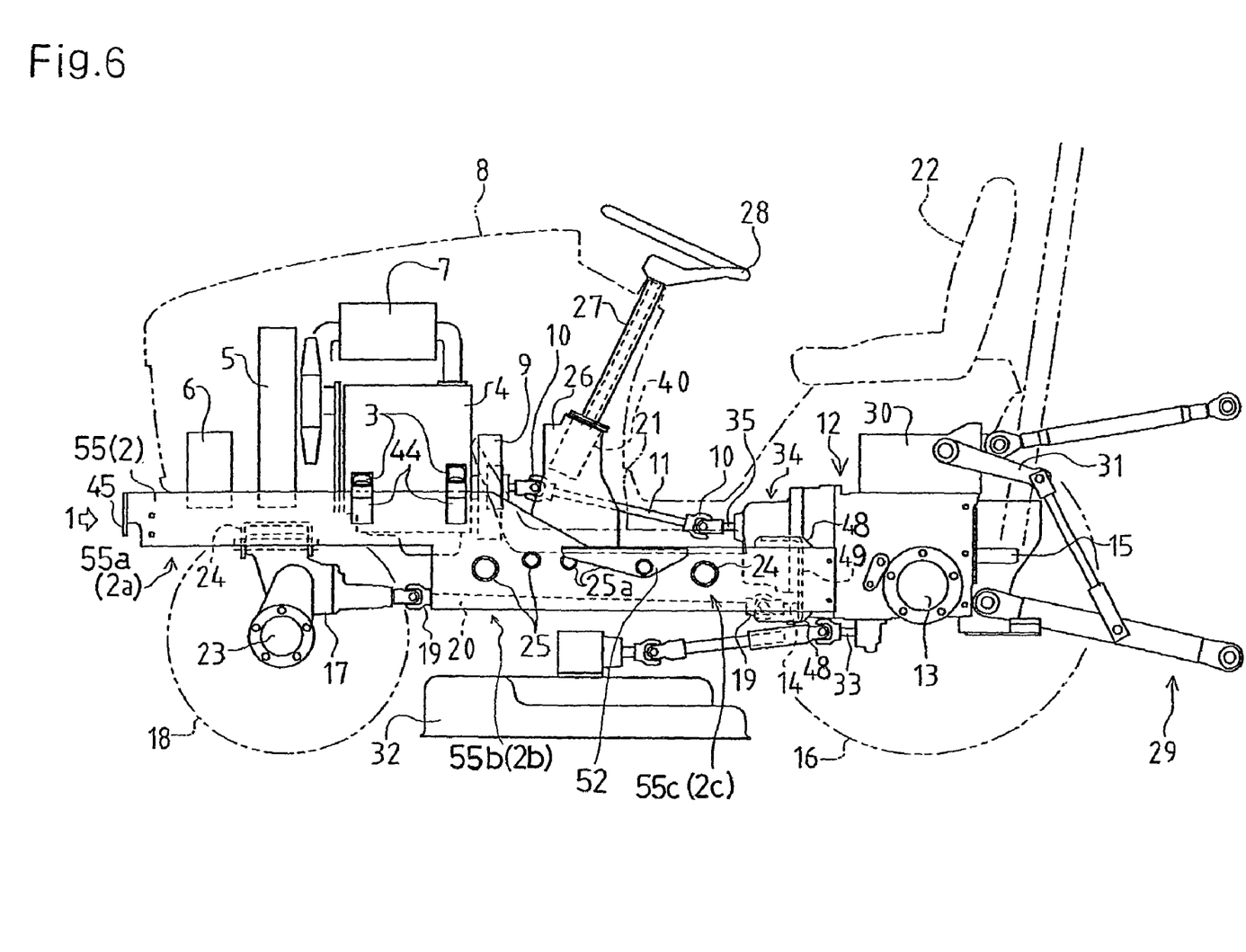
FIG. 6 is a side view of an entire tractor installed with another tractor frame 1 according to a second embodiment of the present invention.

Crossbars 25a, which are the rear two of crossbars 25 and 25a are juxtaposed before and behind at the same height. A steering column base 26, which is laterally shorter than the distance between left and right web portions 2b (or left and right backplates 53), is mounted across laterally intermediate portions of all crossbars 25a so as to project upward between left and right side frame elements 2, as shown in FIGS. 3, 8 and 9. As shown in FIGS. 1 and 6, a steering column 27 is extended upward from steering column base 26, and a steering wheel 28 is provided on a top of steering column 27. A power steering hydraulic pressure device 40 is disposed in steering column base 26. Thus, crossbars 25a for connecting both side frame elements 2 to each other and reinforcing tractor frame 1 also serves as a supporter for supporting the bottom of steering column base 26, thereby reducing the number of parts and expenses.

A footboard supporter 52 is provided on the outside of rear level portion 2c of each side frame element 2, which is lower than front level portion 2a. In the first embodiment of FIGS. 1 to 5, behind each of backplates 53 (i.e., web portions 2b), footboard supporter 52 is provided on the outside of each of left and right side plates 47 of rear frame member 42. In the second embodiment of FIGS. 6 to 9, footboard supporter 52 is provided on the outside of rear level portion 55c of each side frame member 55.

Footboard supporter 52 comprises a support bar 52a and a stay 52b. Support bar 52a projects laterally outward from rear level portion 2c of each of side frame elements 2 of tractor frame 1. Stay 52b is fixed onto an outer end of support bar 52a. A top surface of stay 52b is substantially as high as the top edge of rear potion 2c.

Each of left and right footboards 21, on which respective left and right feet of a driver sitting on seat 22 are placed, is spread across stay 52b of each footboard supporter 52 and the top edge of rear level portion 2c of each side frame element 2.

In each side frame element 2, the top edge of rear level portion 2c falls a degree from the top edge of front level portion 2a.

Thus, footboards 21 provided on rear level portions 2c of left and right side frame elements 2 are low enough to be utilized as a step for driver's getting on and off the tractor, thereby enabling another step to be unnecessary.

As mentioned above, left and right support frames 61 are provided onto tractor frame 1 so as to connect front loader 60 to tractor frame 1. As shown in FIGS. 3 and 8, each of support frames 61 comprises a fixture plate 61a, a base member 61b extended laterally outward from fixture plate 61a and a mast 61c projecting upright on an outer end portion of base member 61b.

The base end of each of left and right arms 62 of front loader 60 (shown in FIGS. 2 and 7) is rotatably supported by a top of mast 61c.

Each fixture plate 61a is patched over an outer surface of web portion 2b of each side frame element 2. Web portion 2b over which fixture plate 61a is patched is vertically longer than any other portion (front and rear level portions 2a and 2c) of each side frame element 2, thereby being strong enough to support front loader 60.

Furthermore, fixture plate 61a can be as long in the longitudinal direction of tractor frame 1 as the longitudinal length of web portion 2b which is larger than the total vertical height of front and rear level portions 2a and 2c, thereby being strong enough to support front loader 60.

In the first embodiment of FIGS. 1 to 5, each fixture plate 61a is patched across outside surfaces of side plates 43 and 47 and fastened to side plates 43 and 47 through bolts. The portion of tractor frame 1 to which fixture plates 61a is joined is previously reinforced by backplate 53 and crossbars 25. By patching each of fixture plates 61a, the vertically jointed portion of side plates 43 and 47 of both frame members 41 and 42 is sandwiched between fixture plate 61a and each of backplates 53, thereby being strong enough to endure the load caused by the work of front loader 60.

In the second embodiment of FIGS. 6 to 9, each fixture plate 61a is patched over the outside surface of web portion 55b of each side frame member 55, which is previously reinforced by backplate 53 as shown in FIG. 8 (or by being thickened as shown in FIG. 9) and by crossbars 25 so as to be strong enough to endure the load caused by the work of front loader 60.

Figure 7:
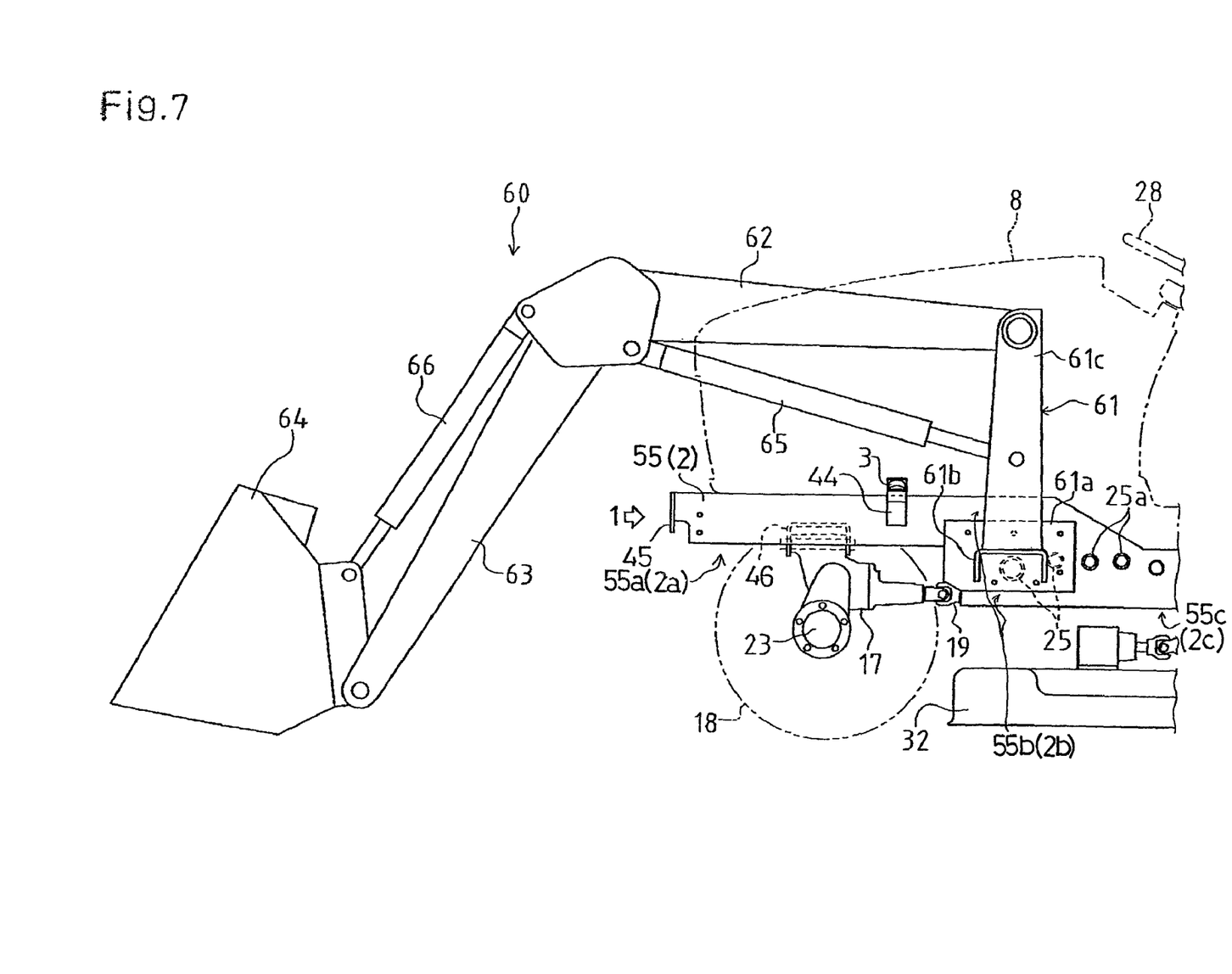
FIG. 7 is a side view of a front portion of the tractor wherein front loader 60 is supported by tractor frame 1 according to the second embodiment.

As mentioned above, support frames 61 for supporting front loader 60 are attached to outer side surfaces of respective sufficiently reinforced web portions 2b so as to be provided on both left and right sides of tractor frame 1, thereby being prevented from interfering with mower 32 disposed below the longitudinally intermediate bottom portion of tractor frame 1. Thus, as shown in FIGS. 2 and 7, the tractor can be simultaneously provided with both mower 32 and front loader 60, thereby increasing its utility.

It is further understood by those skilled in the art that the foregoing description is a preferred embodiment of the disclosed apparatus and that various changes and modifications may be made in the invention without departing from the spirit and scope thereof.

What is claimed is:

1. A tractor frame, comprising:
   a pair of left and right cranked side frame elements disposed parallel to each other, each of said cranked side frame elements including:
      a front level portion;
      a rear level portion, wherein a top of said rear level portion is lower than a top of said front level portion, wherein a footboard is provided on the top of said rear level portion; and
      a web portion located at a longitudinally intermediate portion of the cranked side frame element where said front level portion and said rear level portion overlap; and
   a cross member interposed between said web portions of both said cranked side frame elements so as to connect both said cranked side frame elements, wherein the web portion is longitudinally longer than a total height of the frame measured from a bottom of the rear level portion to a top of the front level portion.

2. The tractor frame as set forth in claim 1, wherein said front level portions of said cranked side frame elements support an engine and a front axle casing, and wherein said rear level portions of said cranked side frame elements support a transmission.

3. The tractor frame as set forth in claim 1, further comprising:
   a backplate patched over said web portion of each of said cranked side frame elements.

4. The tractor frame as set forth in claim 1, wherein said web portion of each of said cranked side frame elements is thickened.

5. The tractor frame as set forth in claim 1, further comprising:
   at least two said cross members juxtaposed in front of and behind each other between said cranked side frame elements so as to connect both said side frame elements to each other, wherein a base of a steering column is supported across said at least two cross members.

6. The tractor frame as set forth in claim 1, further comprising:
   a support frame for supporting a front working attachment, said support frame having a fixture portion joined to a side surface of said web portion of each of said cranked side frame elements.

7. The tractor frame as set forth in claim 6, further comprising:
   a backplate patched over said web portion of each of said cranked side frame elements.

8. The tractor frame as set forth in claim 6, wherein said web portion of each of said cranked side frame elements is thickened.

9. The tractor frame as set forth in claim 1, wherein each of said cranked side frame elements is made of a single member.

10. The tractor frame as set forth in claim 1, further comprising:
    a front frame member including a pair of parallel left and right side portions, each of said side portions of said front frame member serving as said front level portion and an upper half of said web portion; and
    a rear frame member including a pair of parallel left and right side portions, each of said side portions of said rear frame member serving as said rear level portion and a lower half of said web portion, wherein rear bottom edges of said side portions of said front frame member are joined to front top edges of said side portions of said rear frame member, thereby constituting said left and right cranked side frame elements.

11. The tractor frame as set forth in claim 10, further comprising:
    a backplate patched across a rear of each of said side portions of said front frame member serving as said upper half of said web portion and a front of each of said side portions of said rear frame member serving as said lower half of said web portion, wherein said cross member is interposed between said web portions of both said cranked side frame elements through said backplates.

12. A method of producing a tractor frame, comprising the steps of:
    producing a front frame member including a pair of parallel left and right side portions;
    producing a rear frame member including a pair of parallel left and right side portions;
    joining rear bottom edges of said side portions of said front frame member to front top edges of said side portions of said rear frame member, thereby constituting left and right cranked side frame elements of a tractor frame, wherein an area in which the front and rear frame members vertically overlap is longitudinally longer than a total height of the frame measured from a bottom of said rear frame member to a top of said front frame member;
    providing a footboard on top of said rear frame member side portions; and
    interposing a cross member between vertically overlapping portions of said front and rear frame members so as to connect said left and right cranked side frame elements to each other.

* * * * *